United States Patent [19]

Terada et al.

[11] Patent Number: 5,197,078
[45] Date of Patent: Mar. 23, 1993

[54] GAS LASER APPARATUS

[75] Inventors: Mitsugu Terada; Ken Ohmata; Michito Uehara; Hideaki Shibata; Yasuo Oeda; Yuichiro Terashi, all of Sodegaura, Japan

[73] Assignee: Mitsui Petrochemical Industries, Ltd., Tokyo, Japan

[21] Appl. No.: 708,498

[22] Filed: May 31, 1991

[30] Foreign Application Priority Data

Jun. 1, 1990 [JP] Japan .................................. 2-143447
Jul. 20, 1990 [JP] Japan .................................. 2-192156

[51] Int. Cl.⁵ .............................................. H01S 3/22
[52] U.S. Cl. ...................................... 372/55; 372/103; 372/59; 372/61
[58] Field of Search ...................... 372/92, 99, 55, 98, 372/59, 61, 103, 107, 108

[56] References Cited

U.S. PATENT DOCUMENTS 3,889,209  6/1975  Lavarini ............................. 372/103
3,993,965  11/1976 Alves et al. ........................ 372/103
4,718,071  1/1988  Steffen .............................. 372/58

Primary Examiner—Léon Scott, Jr.
Attorney, Agent, or Firm—Sherman and Shalloway

[57] ABSTRACT

A gas laser apparatus having transparent laser windows provided on a laser chamber body, in which operating gases is sealed if necessary, comprising circulation means connected to the laser chamber body through an intake port and a discharge port for circulating gases within the laser chamber body and filtration means disposed in said circulation means, further comprising cutoff means for preventing the laser windows from being stained and open and closeably cutting off between the laser chamber body and the laser windows, and having a construction wherein in replacing the laser window, the cutoff means is once placed in a cutoff state, and the laser window is separated from the laser chamber body to place the laser window.

7 Claims, 6 Drawing Sheets

GAS LASER APPARATUS

BACKGROUND OF THE INVENTION

The present invention relates to a gas laser apparatus, and particularly to the technique for facilitating the maintenance of a transparent window provided as a laser output portion in a laser chamber body in which gas is sealed.

Recently, attention has been paid to a gas laser as a light source for various industries. Particularly, a krypton fluoride excimer laser and an argon fluoride excimer laser have been expected to be applied to fields of a semiconductor lithography light source and the like as a powerful ultraviolet light source, and the study thereof toward the practical use has been progressed.

The excimer laser is called a discharge exciting type, in which two electrodes are arranged in an atmosphere of a mixture of rare gases such as xenon, krypton and argon and halogen gases such as chlorine and fluorine, and a high voltage discharge is produced between the electrodes to thereby constitute an optically active dimer.

This dimer serves as a laser medium to obtain the ultraviolet laser oscillation of 248 nm in the krypton fluoride excimer laser type and 193 nm in the argon fluoride excimer laser type.

The aforesaid gas mixture is filled in a pressure vessel called a laser chamber, which is provided with discharge electrodes made of aluminum nickel or other metal and a gas circulating device, and a beam removing laser window formed of nitric material having an excellent ultraviolet permeative characteristic. Externally of the laser chamber are arranged a high voltage power source, a gas supply system, various control systems and so on.

A voltage of 20 to 30 KV is applied between the aforementioned discharge electrodes to create discharges at high frequency. It is known that the discharge electrodes become worn due to the sputtering effect during that period.

Metal powders generated due to the aforesaid abrasion are formed into powdery dusts, which float within the laser chamber and a part thereof becomes deposited on the laser window. When an ultraviolet laser beam is irradiated on surface of the laser window.

If such a state as described above is present, a laser output to be removed outside passing through the laser window is not only lowered but also the stable laser output cannot be obtained.

To cope with this situation, in prior art, gases are circulated within the laser chamber to blow the gases against the internal surface of the laser window so as to blow off the powdery dust close to the laser window.

Furthermore, in the case where the aforesaid technique is insufficient, a laser window 51 provided in a laser chamber 50 is designed to be detachable as shown in FIG. 8, so that the laser window 51 is periodically replaced to maintain the transparency.

However, in the aforesaid conventional apparatus, gases containing powdery dust are merely circulated to blow them against the internal surface of the laser window, and therefore, there is a problem in that the effect for preventing adhesion of powdery dust is low.

Another problem is that even in the case of the construction in which the laser window can be replaced as described above, when replacing, the interior of the laser chamber 50 comes into communication with open air, and as a result a gas leak and entry of outside air tend to occur.

Since the outside air contains oxygen or water content, these cause the interior of the laser chamber to be stained, thus requiring the running-in for restoration.

As described above, much labor and cost are required for replacement of a laser window and thereafter maintenance.

The present invention has been achieved in view of the aforementioned circumstances and provides the technique which can keep the interior of a laser chamber clean for long periods and which can prevent the interior of the laser chamber from contracting outside air when the laser window is replaced despite a handy construction.

SUMMARY OF THE INVENTION

In order to solve the aforesaid technical problems, the present invention provides a gas laser apparatus in which transparent windows 2 are provided on laser chamber body 1, in which operating gas is sealed, comprising a circulation means 32 connected to the laser chamber body 1 through a intake port 30 and discharge ports 31 to circulate gases within the body 1, and a filtration means 33 provided in the midst of the circulation means 32.

Alternatively, a sub-chamber 34 is provided on the end of the laser chamber body 1, the aforesaid laser window 2 is provided at the extreme end of the sub-chamber 34, and the aforesaid discharge port 31 is provided on the sub-chamber 34.

The laser chamber body 1 and the laser window 2 are connected by a connection block 3a, and the connection block 3a and the laser body 1 are made to be detachable.

A valve portion 4 is provided in the midst of the connection block 3a, and the valve portion 4 had a spherical body 6 arranged rotatably and airtightly within a passage 5, the spherical body 6 being formed with a communication passage 7.

The communication passage 7 is rotated by rotation of the spherical body 6 so as to open the close the passage 5.

Alternatively, the spherical body 6 is rotatably and airtightly arranged within the connection body 3 having one end mounted on the laser chamber body 1 and formed with a passage 8.

The spherical body 6 is formed with the communication passage 7, and a ring-like projection 10 projected substantially vertical to the axial direction of the communication passage is provided on the inner surface of the communication passage 7. Laser windows 2 and 2 are detachably provided on both sides of the ring-like projection 10. The spherical body 6 is rotated to thereby revese the position of two laser windows.

In replacing the laser window 2, the connection means 3 as the cut-off means is one placed in the cut-off state, and the laser window 2 is separated from the interior of the laser chamber body 1, after which the laser window 2 is replaced. After replacement of the laser window 2, the connection block 3 is placed in the open state and the laser window 2 is made face to the interior of the laser chamber body 1. Thus, the outside air is not directly contacted with the interior of the laser chamber body 1, and the interior of the laser chamber body 1 is not possibly stained.

According to the present invention, there can be provided a gas laser apparatus in which the interior of the laser chamber body 1 is prevented from being stained, the laser window 2 can maintain its clean state for long periods, the laser window can be replaced extremely easily, and the interior of the laser chamber is not contacted with the outside air when replacing the laser window.

BRIEF DESCRIPTION OF THE DRAWINGS

FIGS. 1 is a partly cutaway schematic side view.
FIGS. 2 is a perspective view.
FIGS. 3 is a partial side view.
FIGS. 4 is a partial sectional view.
FIG. 5 is a side view.
FIG. 6 is a partial sectional view.

DESCRIPTION OF PREFERRED EMBODIMENTS OF THE INVENTION

First Embodiment

Figure 1:
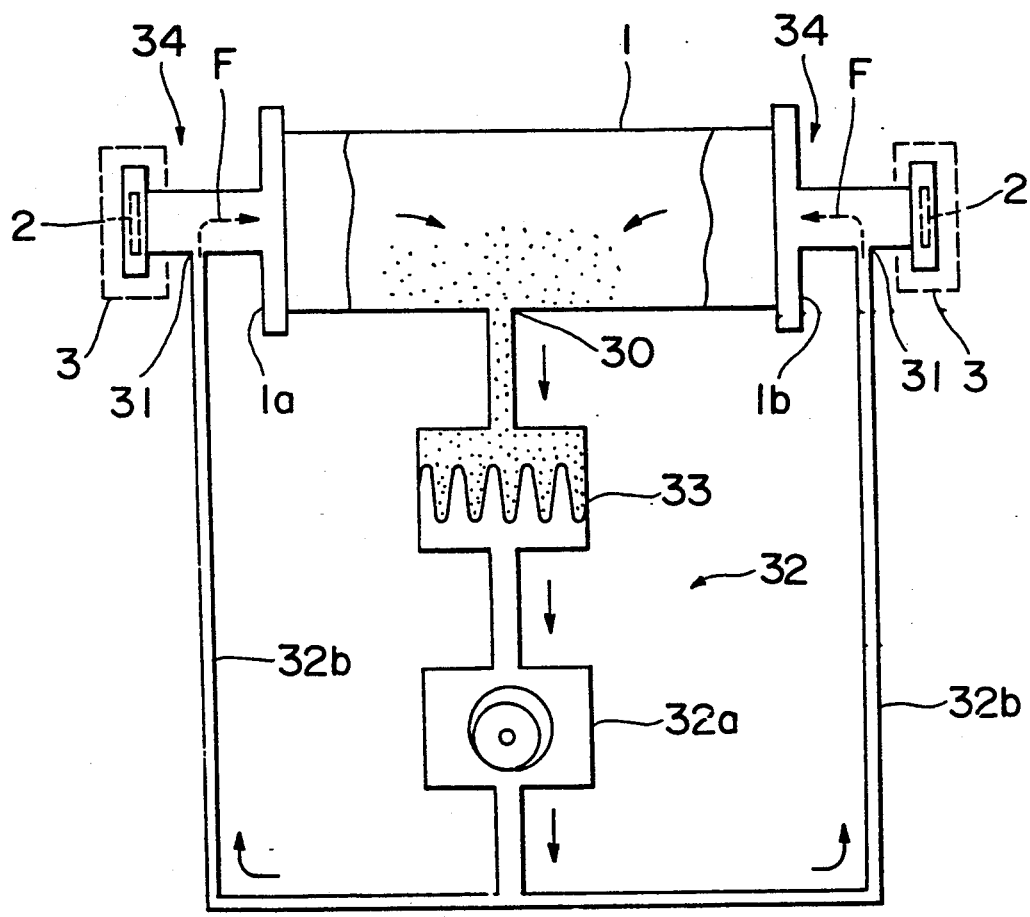
FIGS. 1 to 4 show a first embodiment.

As shown in FIG. 1, a laser chamber body 1 has a substantially cylindrical shape, opposite ends of which are closed by blocking plates 1a and 1b. The body 1 is interiorly provided with a discharge electrode and a gas circulating device and filled with a mixture of rare gases such as argon and halogen gases such as chlorine and fluorine. Sub-chambers 34 are provided in said blocking plates 1a and 1b, respectively. The sub-chamber 34 has a cylindrical shape having a diameter smaller than that of the laser chamber body 1, and a laser window 2 is mounted at the extreme end thereof.

An intake port 30 is provided substantially in the central portion of the laser chamber body 1, said intake port 30 being connected to a circulation means 32. The circulation means 32 comprises a circulation pump 32a and a gas tube 32b connected thereto, and a filtration means 33 is provided in the midst thereof. The gas tube 32b is connected to the intake port 30, and the circulation pump 32a is connected through the filtration means 33. The gas tube 32b is connected to the discharge side of the circulation pump 32a, and the extreme end thereof is open into the sub-chamber 34. With the aforesaid structure, when the circulation pump 32a is actuated, the gas flows as indicated by the arrow F. Dust in the gases are filtrated by the filtration means 33 and jetted into the subchamber 34 at high speeds. Therefore, the interior of the sub-chamber 34 becomes high pressure as compared with other portions of the interior of the laser chamber body 1 to prevent the dust from moving toward the laser window 2.

Figure 2:
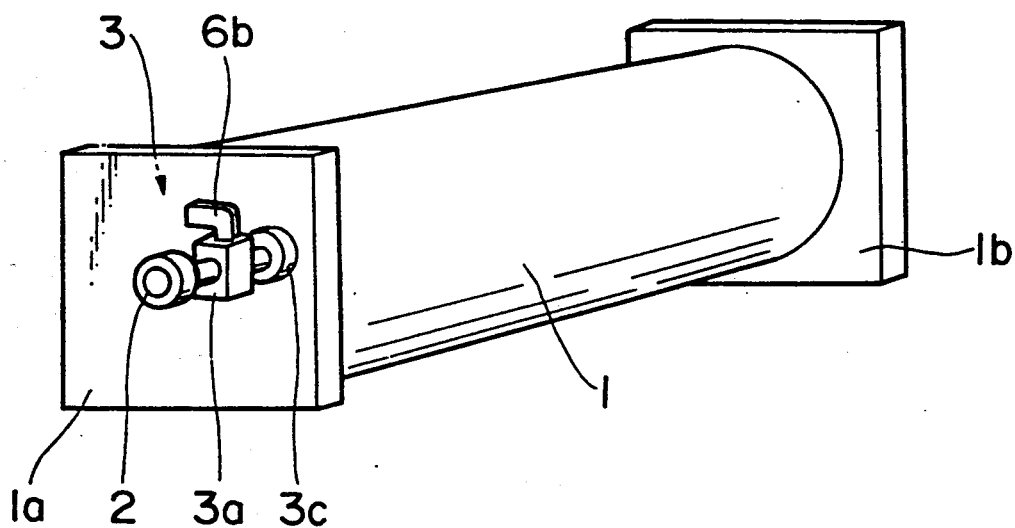

Although not shown in FIG. 1, in the present embodiment, a connection block 3 capable of cutting off the interior of the laser chamber body 1 from the outside air for facilitating the replacement of the laser window 2 is shown in FIG. 2.

Figure 3:
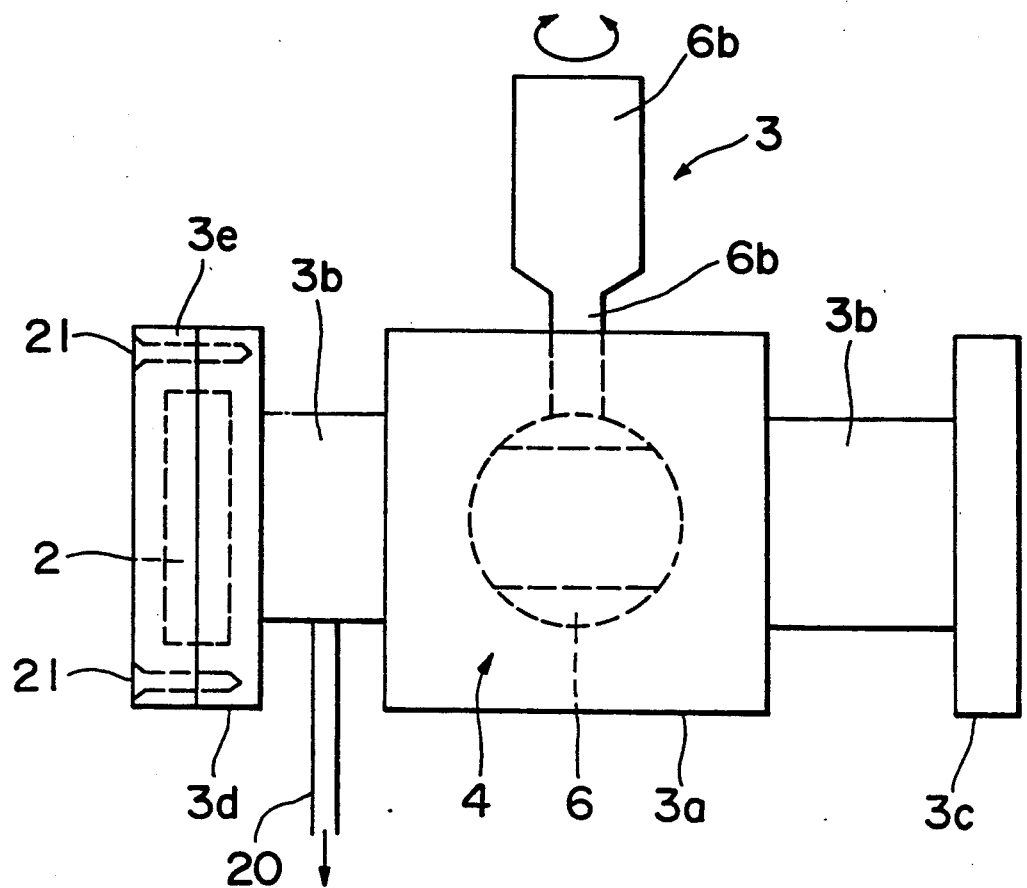

The connection block 3 as the cutoff means will be described hereinafter with reference to FIGS. 2 to 4. The laser window 2 is detachably mounted on the extreme end of the connection block 3a mounted on the blocking plate 1a. A valve portion 4 is provided in the midst of the connection block 3a as shown in FIG. 3, the valve portion 4 having pipes 3b and 3b provided on opposite ends thereof, and a flange 3c is provided on the extreme end of the pipe 3b. The flange 3c is mounted on the blocking plate 1a.

A flange 3d is provided on the extreme end of the other pipe 3b. A mounting ring 3e for mounting the laser window 2 is screwed at 21 to the flange 3d. An exhaust pipe 20 connected to an exhaust system not shown is provided on the other pipe 3b.

The valve portion 4 has a spherical body 6 rotatably and airtightly arranged within a passage 5 formed in the connection block 3a, the spherical body 6 being formed with a communication passage 7. An externally extending shaft 6 is provided externally of the spherical body 6. A cock knob 6b is formed at the extreme end of the shaft 6a so that the spherical body 6 can be rotated from outside.

Figure 4:
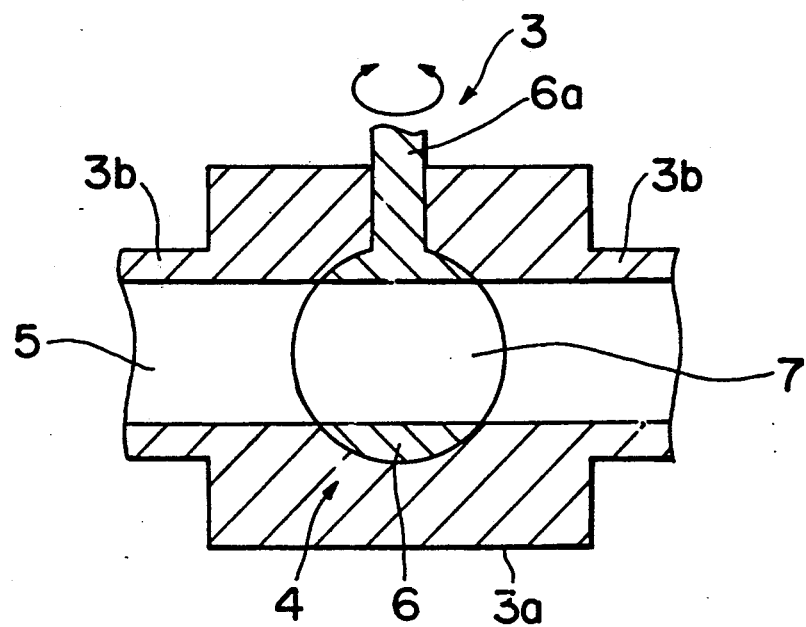

With the aforementioned structure, in operating the laser apparatus, the communication passage 7 is brought into communication with the passage 5, as shown in FIG. 4 for use. Thereby, the laser beam is outputted from the laser window 2 passing through the communication passage 7 and the passage 5.

On the other hand, in replacing the laser window 2, the cock knob 6b is rotated through 90 degrees from the aforesaid state, and the passage 5 is closed by the spherical body 6. In this case, the direction of the communication passage 7 is in the positional relationship of 90 degrees with respect to the direction of the passage 5. In this state, the interior of the laser chamber body 1 and the laser window 2 are in the closed state, and therefore, the screw 21 is removed to remove the mounting ring 3e and the laser window 2 is removed. Then, a new laser window 2 is mounted. Thereafter, the cock knob 6b is rotated through 90 degrees to bring the passage 5 into communication with the communication passage 7 to complete the replacing work.

Controlling of laser beam generated within the laser chamber body 1 is, in normal case, accomplished by controlling laser beam outputted from the laser window 2 by an optical control system (not shown). However, the cock knob 6b may be rotated to control irradiation and cutoff of the laser beam.

Second Embodiment

Figure 5:
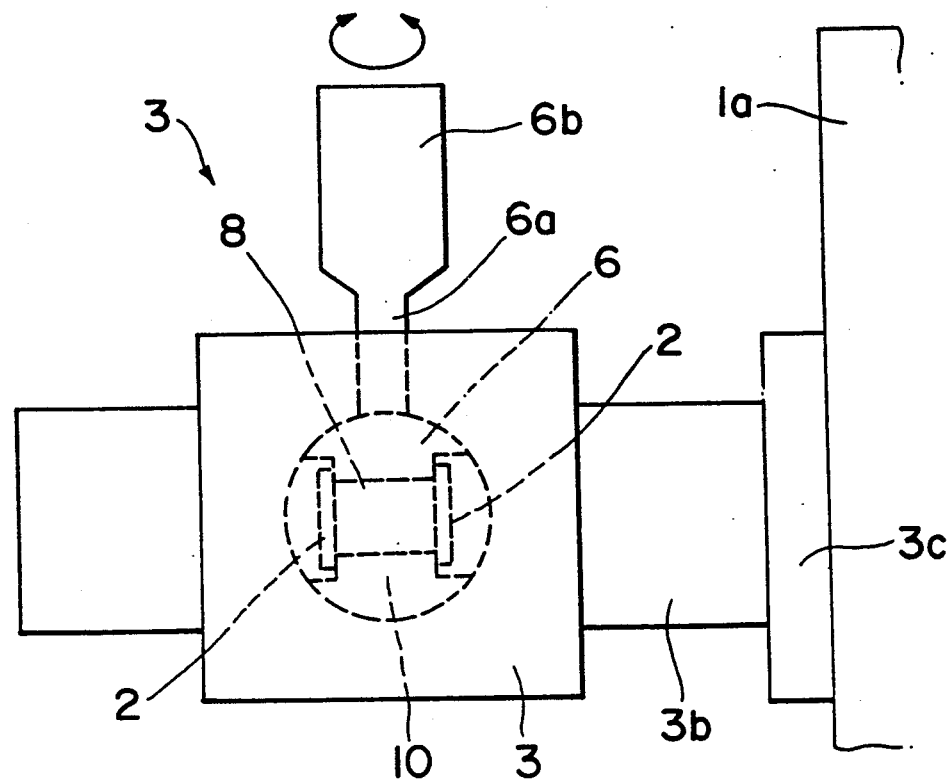
FIGS. 5 and 6 show a second embodiment.
Figure 6:
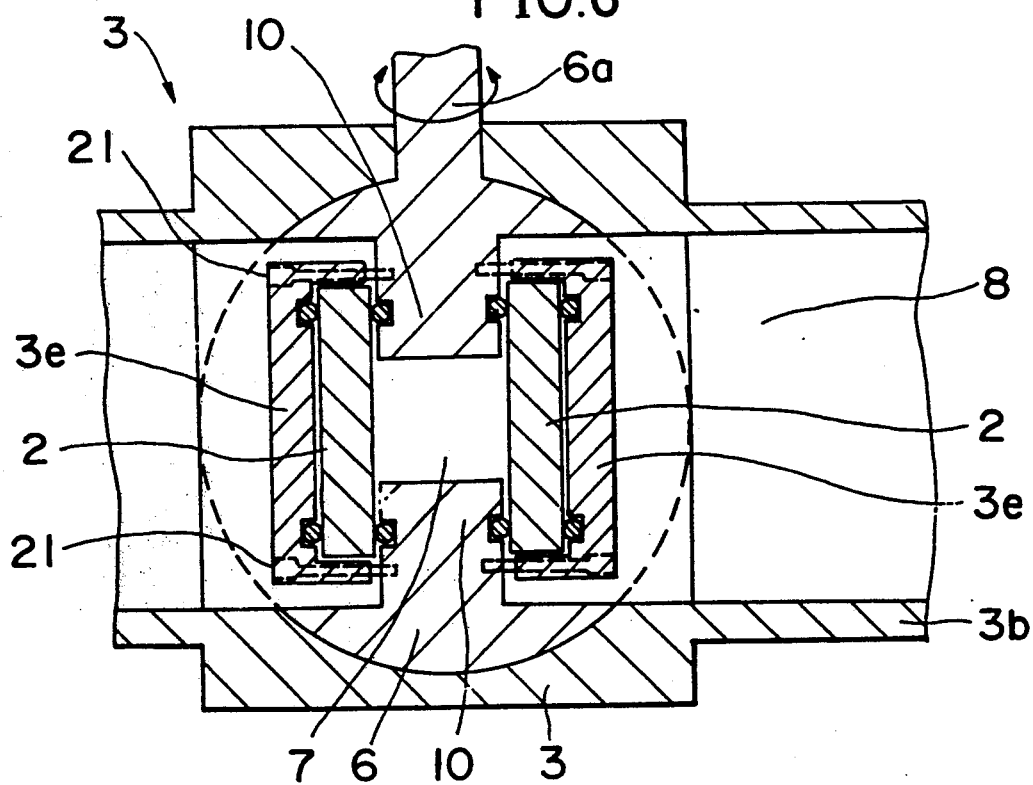

FIGS. 5 and 6 show a second embodiment of the connection block 3 as the cutoff means. Parts which are substantially the same as those described in connection with the aforementioned conventional example are indicated by the same reference numerals, and explanation thereof will be omitted.

The spherical body 6 is interiorly provided with laser windows 2 and 2.

The spherical body 6 is rotatably and airtightly arranged within the connection block 3 formed with the passage 8, and the spherical body 6 is formed with the communication passage 7. A ring-like projection 10 projected substantially vertically with respect to the axial direction of the communication passage 7 is provided on the inner surface of the communication passage 7, and the laser windows 2 and 2 are detachably provided on both sides of the ring-like projection 10. The laser windows 2 and 2 are detachably fixed by the ring 3e and screw 21 in a manner similar to the aforementioned first embodiment.

In the spherical body 6, in the position shown in FIG. 6, the communication passage 7 and passage 8 are positioned on one and the same axis and the light passes throught the laser windows 2 and 2. When it is rotated through 90 degrees from that position, the side of the spherical body 6 is positioned at the passage 8 and the passage 8 is closed, and when further rotated through 90 degrees, the position of the laser windows 2 and 2 is reversed.

With the aforementioned structure, in operating the laser apparatus, the cock knob 6b is set so that the communication passage 7 and passage 8 are positioned on one and the same axis, and the laser beam is removed outside through the laser windows 2 and 2.

On the other hand, in replacing the laser window 2, the cock knob 6b is rotated through 180 degrees from the aforesaid state, the position of the laser windows 2 and 2 is reversed. As a result, the laser window being stained by the laser oscillation is directed outwardly, whereas the external laser window being not stained is directed inwardly of the laser chamber body 1. Even in this state, the laser chamber body 1 remains closed with respect to the outside air. The screw 21 is removed to remove the mounting ring 3e, and the stained laser window 2 is replaced.

In case where the laser window 2 directed inwardly of the laser chamber body 1 is again replaced, the cock knob 6b is rotate through 180 degrees (initial state) to remove the screw 21 and remove the mounting ring 3e, and the stained laser window 2 is replaced. Then, two laser windows 2 and 2 initially mounted are replaced with new ones.

The first and second embodiments are particularly effective when use is made for application in which slight stain of the laser window 2 comprises a trouble. The other functions will not be described since they are similar to the first embodiment.

Third Embodiment

Figure 7:
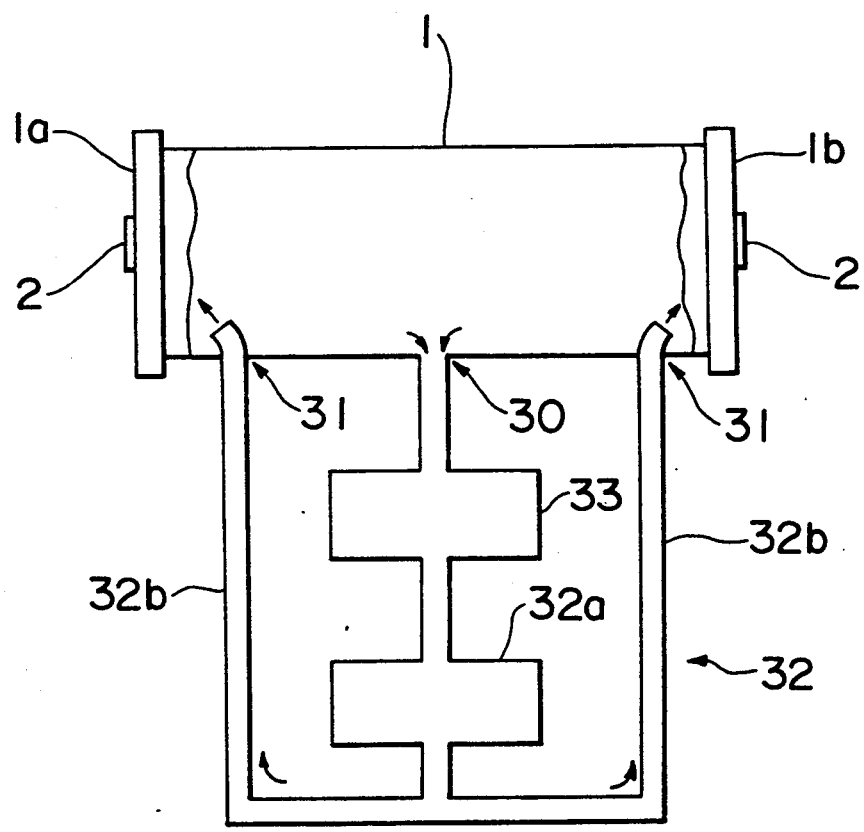
FIG. 7 is a partly cutaway side view of a third embodiment.
Figure 8:
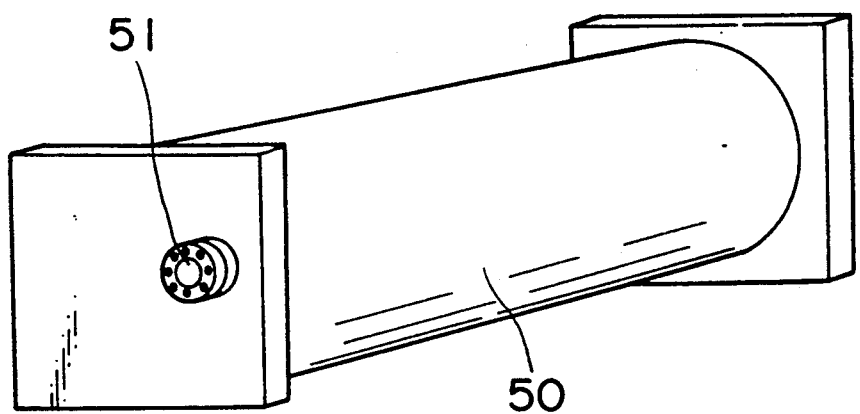
FIG. 8 is a perspective view showing a conventional gas laser apparatus.

FIG. 7 shows a third embodiment, in which a discharge port is directly mounted on the laser chamber body 1, and a blow-off nozzle thereof is directed toward the inner surface of the laser window 2. Thereby, clean gases are always blown against the inner surface of the laser window 2 to prevent the dust from being deposited.

The present embodiment is effective when used in combination of the window replacing mechanism described in connection with the first and second embodiments.

What is claimed is:

1. A gas laser apparatus comprising:
   a hollow laser chamber body having a first open end and a second open end and a central portion connecting said first open end and said second open end, said hollow laser chamber body being receivable of a gaseous medium;
   first closure means for hermetically sealing said first open end, said first closure means including a first laser window means for allowing a laser beam to pass through said first closure means;
   second closure means for hermetically sealing said second open end, said second closure means including a second laser window means for allowing a laser beam to pass through said second closure means;
   gas circulation means, operatively connected to said hollow laser chamber body, said first closure means and said second closure means, for removing a gas from said central portion of said hollow laser chamber body and returning said gas to said hollow laser chamber body proximate said first open end and proximate said second open end, said gas circulation means including filter means for removing particulate solids from said gas withdrawn from said central portion of said hollow laser chamber.

2. The gas laser apparatus according to claim 1, wherein said first closure means comprises a first hollow subchamber having a first open end and a second open end, said first open end of said first subchamber communicating with and hermetically sealed to said first open end of said hollow laser chamber body, said second open end of said laser subchamber being hermetically sealed by a first closure member, said first closure member including said first laser window means;
   said second closure means comprises a second hollow subchamber having a first open end and a second open end, said first open end of said second subchamber communicating with and hermetically sealed to said second open end of said hollow laser chamber body, said second open end of said second subchamber being hemetically sealed by a second closure member, said second closure member including said second laser window means;
   said gas returned to said hollow laser chamber body proximate said first open end being fed to said first hollow subchamber;
   said gas returned to said hollow laser chamber body proximate said second open end being fed to said second hollow subchamber.

3. The gas laser apparatus according to claim 1, wherein said first closure means comprises a first hollow member having a first open end and a second open end, said first open end of said first hollow member communicating with and hermetically sealed to said first open end of said hollow laser chamber body, said second open end of said first hollow member being hermetically sealed by a first closure member, said first closure member including said first laser window means detachably mounted therein, said first hollow member including first valve means, intermediate said first open end and said second open end of said first hollow member, for releasably hermetically sealing off said first open end from said second open end;
   said second closure means comprises a second hollow member having a first open end and a second open end, said first open end of said first hollow member communicating with and hermetically sealed to said second open end of said hollow laser chamber body, said second open end of said second hollow member being hermetically sealed by a second closure member, said second closure member including said second laser window means detachably mounted therein, said second hollow member including second valve means, intermediate said first open end and said second open end of said second hollow member, for releasably hermetically sealing off said first open end from said second open end.

4. The gas laser apparatus according to claim 3, wherein said first valve means and said second valve means each comprises a ball valve.

5. The gas laser apparatus according to claim 1, wherein said first closure means comprises a first ball valve and said second closure means comprises a second ball valve;
   said first ball valve comprising a first valve body and a first ball member rotatably contained within said first valve body, said first ball member having a first passageway therethrough communicable with said first open end of said hollow laser chamber body, said first ball member being rotatable within said first valve body about an axis perpendicular to said first passageway, said first passageway having a pair of spaced apart laser windows detachably mounted therein, each of said windows hermetically sealing said passageway;

said second ball valve comprising a second valve body and a second ball member rotatably contained within said second valve body, said second ball member having a second passageway therethrough communicable with said second open end of said hollow laser chamber body, said second ball member being rotatable within said second valve body about an axis perpendicular to said second passageway, said second passageway having a pair of spaced apart laser windows detachably mounted therein, each of said windows hermetically sealing said passageway.

6. The gas laser apparatus according to claim 1, wherein said gas returning to said hollow laser chamber body proximate said first open end and said second open end is directed at said first laser window means and said second laser window means, respectively.

7. A gas laser apparatus comprising:

a hollow laser chamber body having a first open end and a second open end and a central portion connecting said first open end and said second open end, said hollow laser chamber body being receivable of a gaseous medium;

first closure means for hermetically sealing said first open end, said first closure means comprises a first hollow member having a first open end and a second open end, said first open end of said first hollow member communicating with and hermetically sealed to said first open end of said hollow laser chamber body, said second end of said first hollow member being hermetically sealed by a first closure member, said first closure member including first laser window means detachably mounted therein, said first hollow member including first valve means, intermediate said first open end and said second open end of said first hollow member, for releasably hermetically sealing off said first open end from said second open end;

second closure means for hermetically sealing said second open end, said second closure means comprises a second hollow member having a first open end and a second open end, said first open end of said first hollow member communicating with and hermetically sealed to said second open end of said hollow chamber body, said second open end of said second hollow member being hermetically sealed by second closure member, said second closure member said second laser window means detachably mounted therein, said second hollow member including second valve means, intermediate said first open end and said second open end of said second hollow member, for releasably hermetically sealing off said first open end from said second open end.

* * * * *